United States Patent
Hinson

[15] 3,696,870
[45] Oct. 10, 1972

[54] APPARATUS FOR SEPARATING PELLETIZED LEAD OR THE LIKE FROM GRANULAR COMPOSITIONS SUCH AS SOIL

[72] Inventor: James L. Hinson, Arkansas City, Kans.

[73] Assignee: Three Way, Inc., Oklahoma City, Okla.

[22] Filed: Jan. 4, 1972

[21] Appl. No.: 215,362

[52] U.S. Cl. ................................................ 171/17
[51] Int. Cl. ........................................... A01d 17/02
[58] Field of Search ...... 171/17, 24, 14, 117; 209/36, 209/37, 30, 31, 247, 261

[56] References Cited

UNITED STATES PATENTS

| | | | |
|---|---|---|---|
| 2,535,801 | 12/1950 | La Pointe | 171/17 |
| 2,721,656 | 10/1955 | Goodwin | 209/36 |
| 2,756,978 | 7/1956 | Wachsmith | 171/17 |
| 2,808,929 | 10/1957 | Fisher | 209/36 |
| 3,140,254 | 7/1964 | Katzen | 209/30 |
| 3,348,676 | 10/1967 | Karlsson et al. | 209/30 |

*Primary Examiner*—Antonio F. Guida
*Attorney*—Jerry J. Dunlap et al.

[57] ABSTRACT

An apparatus for separating pelletized material or relatively high specific gravity from a heterogeneous granular material of relatively low specific gravity which includes a blower having inlet and outlet, a duct communicating with the outlet of the blower and having the opposite end thereof extending upwardly from the blower, a plurality of spaced parallel bars extending across the duct and secured thereto, a conduit communicating with the duct at a point above the bars for conveying a mixture of the pelletized material and the heterogeneous granular material into the duct, a receptacle communicating with the duct at a point below the bars for receiving and holding the pelletized material which has been separated from the granular material and a motor connected to the blower for driving the blower and causing air to be blown thereby through the duct and over the bars. There is further disclosed a frame upon which the previously described apparatus is supported and which further carries a scoop for engaging the surface of the ground, a conveyor for conveying the mixture of granular material and pelletized material scooped from the ground in an upward direction, and a sifting apparatus for separating excessively large and excessively small pieces or particles of the granular material from the mixture of the granular material and the pelletized material as the mixture passes therethrough from the conveyor to the conduit.

8 Claims, 10 Drawing Figures

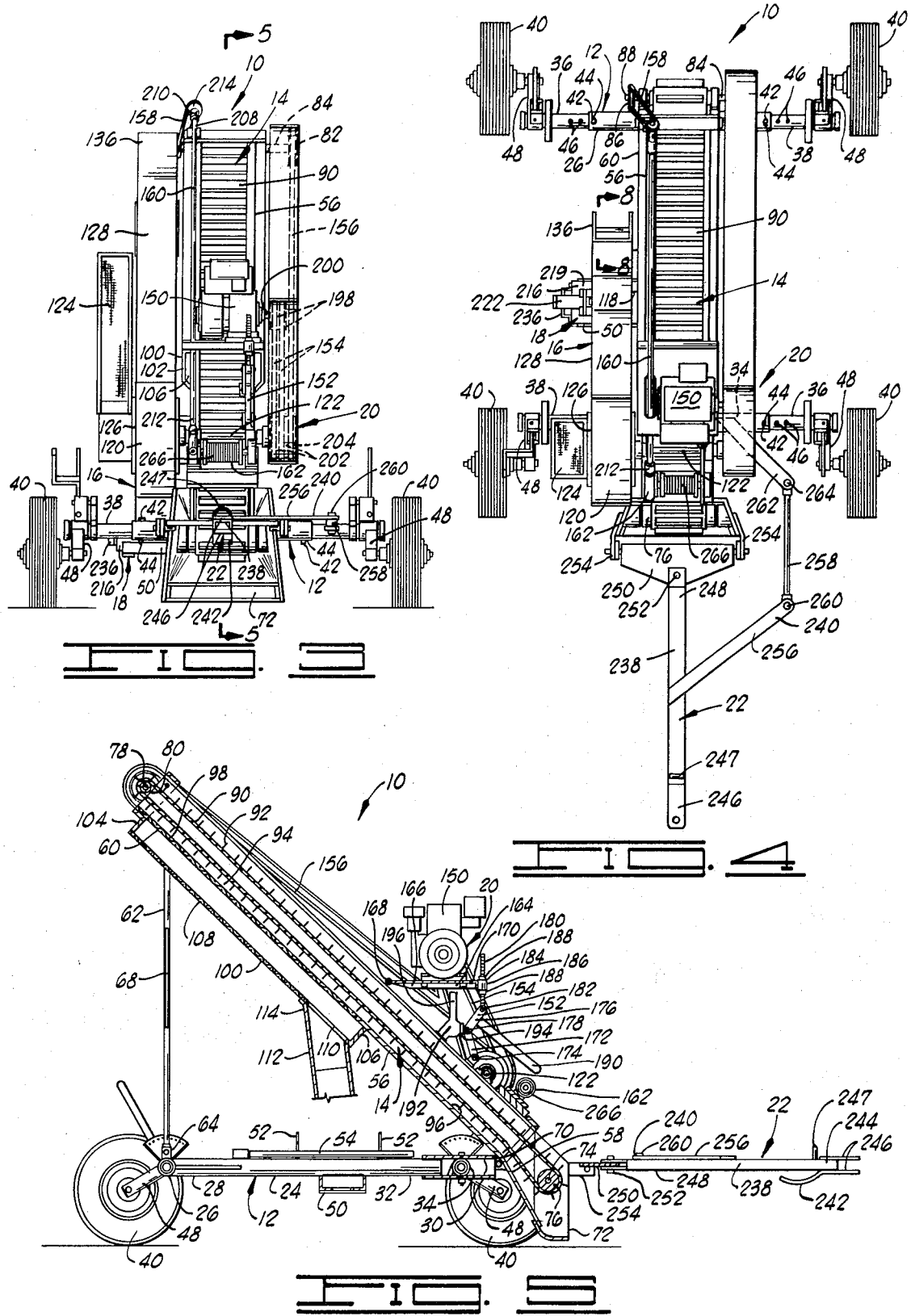

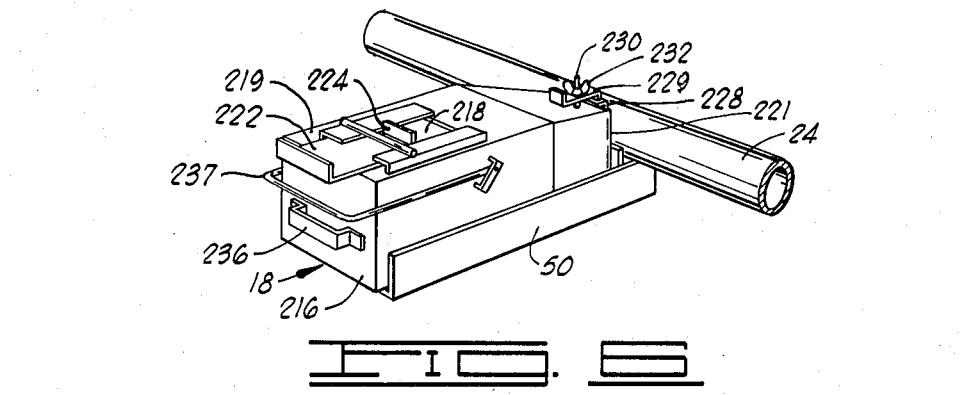
FIG. 6
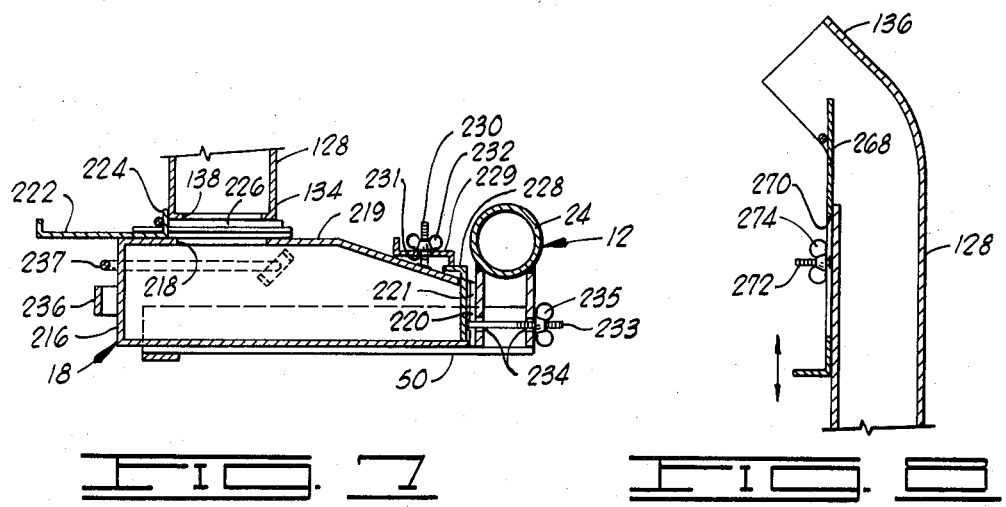
FIG. 7
FIG. 8
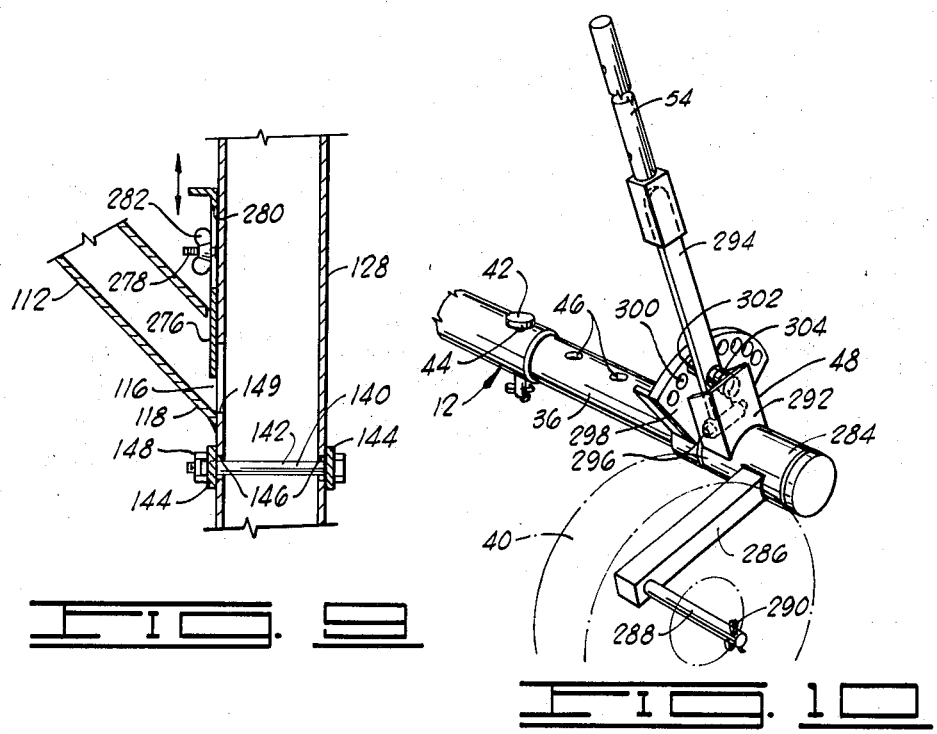
FIG. 9
FIG. 10

APPARATUS FOR SEPARATING PELLETIZED LEAD OR THE LIKE FROM GRANULAR COMPOSITIONS SUCH AS SOIL

BACKGROUND OF THE INVENTION

1. Field of the Invention

This invention relates generally to apparatus for separating pelletized material of relatively high specific gravity from a heterogeneous granular material of relatively low specific gravity. More particularly, but not by way of limitation, this invention relates to apparatus for separating pelletized lead from a heterogeneous granular composition of soil.

2. Description of the Prior Art

Due to the popularity of skeet and trap shooting among shotgunners, many skeet and trap shooting ranges have been created across the country. One factor which has limited growth in the popularity of this hobby in the past has been the expense of purchasing sufficient ammunition for its pursuit by the shotgunner of modest means. One solution to the expense of purchase of ammunition has been the reloading of shotgun ammunition thereby permitting the multiple use of shot shells resulting in a marked decrease in the expense of shotgun ammunition. However, a significant expense to the shot shell reloader is the purchase of shot gun pellets which are normally not reusable because of their dispersion over the shooting range after firing the shotgun. Up to now no satisfactory method has been devised for salvaging the lead shot dispersed on the ground of a skeet or trap shooting range for reuse in reloaded shot shells. The relatively tiny size of the lead shot has made it most difficult, in the past, to separate the shot from the soil in an economical manner which would make it feasible to reuse the shot in reloaded shot shells.

SUMMARY OF THE INVENTION

The present invention generally contemplates an apparatus for separating pelletized material of relatively high specific gravity from a heterogeneous granular material of relatively low specific gravity, comprising a blower having an inlet portion and an outlet portion. A duct communicates at one end thereof with the outlet portion of the blower and the opposite end thereof extends upwardly from the blower. A plurality of spaced parallel bars extend transversely across the duct and are secured thereto. Conduit means communicates with the duct at a point above the bars for conveying a mixture of the pelletized material and the heterogeneous granular material into the duct. Receptacle means communicates with the duct at a point below the bars for receiving and holding the pelletized material which has been separated from the granular material. Driving means is connected to the blower for driving the blower and causing air to be blown thereby from the outlet portion thereof through the duct and over the bars.

One object of the present invention is to provide an apparatus for separating pelletized material of relatively high specific gravity from a heterogeneous granular material of relatively low specific gravity.

Another object of the present invention is to provide an apparatus for separating pelletized lead or the like from granular compositions such as soil which is simple in construction and economical in operation.

One other object of the present invention is to provide an apparatus for separating pelletized lead or the like from granular compositions such as soil which is readily adjustable for use under various terrain conditions.

The foregoing and additional objects and advantages of the present invention will be more apparent as the following detailed description is read in conjunction with the accompanying drawings.

BRIEF DESCRIPTION OF THE DRAWINGS

FIG. 3 is a front elevation view of the present invention.

FIG. 4 is a plan view of the present invention.

FIG. 5 is a cross-sectional view taken along the line 5—5 of FIG. 3.

FIG. 6 is an enlarged fragmentary perspective view illustrating the installation of a receptacle assembly in the receptacle support of the present invention.

FIG. 7 is an enlarged fragmentary cross-sectional view taken along line 7—7 of FIG. 1.

FIG. 8 is an enlarged cross-sectional view taken along line 8—8 of FIG. 4.

FIG. 9 is an enlarged cross-sectional view taken along line 9—9 of FIG. 2.

FIG. 10 is an enlarged fragmentary perspective view more clearly illustrating the construction of a typical rock shaft mechanism.

DESCRIPTION OF THE PREFERRED EMBODIMENT

Figure 1:
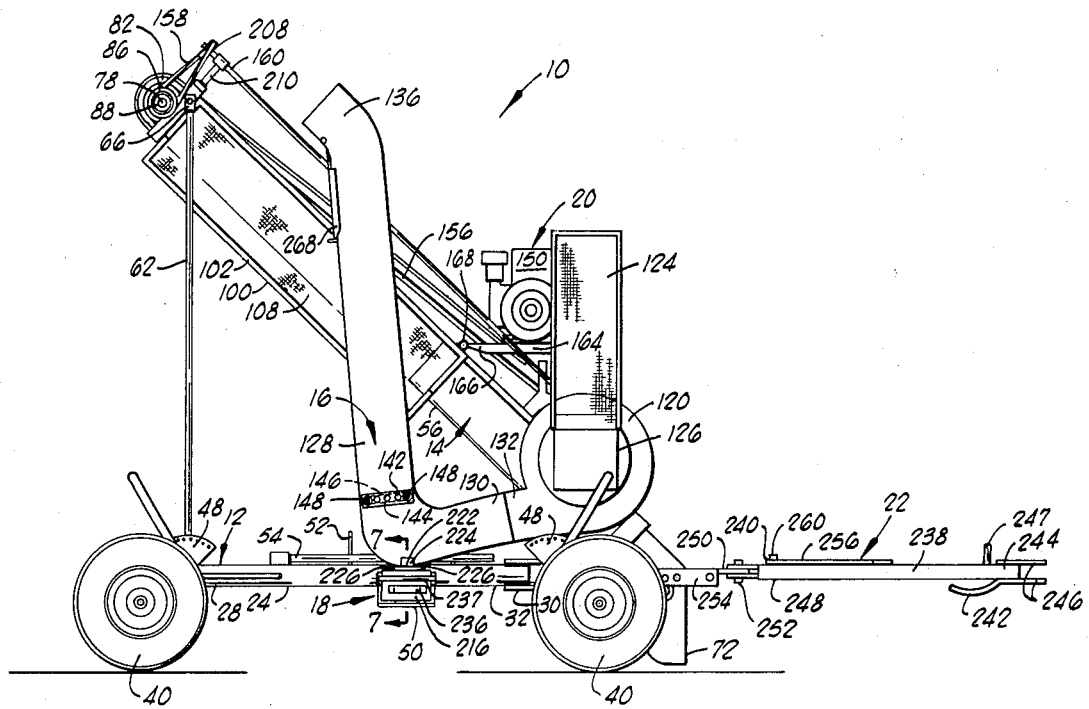
FIG. 1 is a right side elevation view of the present invention.

Referring now to the drawings, and to FIGS. 1-5 in particular, the apparatus of the present invention is generally designated by the reference character 10. The apparatus 10 comprises a frame assembly 12, a conveyor assembly 14, a separator assembly 16, a receptacle assembly 18, a drive assembly 20, and a draft and steering assembly 22.

The frame assembly 12 comprises a longitudinal center frame member 24 having a transverse rear axle 26 rigidly secured to the rear portion 28 thereof. A front axle carrier 30 is fixedly secured to the front portion 32 of the frame member 24. A front axle 34 is pivotally secured at its mid portion to the front axle carrier 30 and is adapted to pivot about a vertical axis as best shown in FIG. 5. Wheel carriers 36 and 38 are telescopically mounted in the respective opposite ends of the rear axle 26 as shown in FIG. 4. A wheel 40 is journaled on each wheel carrier 36 and 38 on the rear axle 26. Similarly, wheel carriers 36 and 38 are telescopically mounted on the respective opposite ends of the front axle 34. A wheel 40 is journaled on each wheel carrier 36 and 38 on the front axle 34.

Each wheel carrier 36 and 38 is secured to a respective axle by means of a vertically oriented pin 42 which passes downwardly through a pair of aligned apertures 44 formed in the respective axle and through a pair of mating aligned apertures 46 formed in the respective wheel carrier 36 or 38. Each wheel carrier 36 and 38 has a plurality of pairs of aligned apertures 46 formed therein in laterally spaced relation. Thus, by selecting the particular pair of aligned apertures 46 desired and placing those apertures 46 in vertical alignment with the apertures 44 and placing the pin 42 therethrough, the lateral distance between the wheels 40 or either axle 26 or 34 may be varied to suit a particular need. This particular arrangement is most helpful when it is desirable to have a wide track between the wheels 40 to provide stability for the apparatus in operation while, at the same time, providing minimum track width between the wheels 40 when storing the apparatus when not in use.

Each wheel carrier 36 and 38 includes a rock shaft mechanism 48 for providing height adjustment of the frame assembly 12 relative to the ground at each wheel 40. The mechanism 48 will be described in greater detail hereinafter.

A receptacle support 50 is fixedly secured to the center frame member 24 at its medial portion and extends horizontally outward therefrom. Extending upwardly from the center frame member 24 are a pair of parallel pins 52. An extension bar 54 is supported by the center frame member 24 when not in use and is retained in position by means of the pins 52 which extend upwardly through matching holes formed in the extension bar 54. The function of the extension bar 54 will be explained more fully hereinafter.

The conveyor assembly 14 comprises a conveyor chute 56 having a lower end portion 58 and an upper end portion 60. The upper end portion 60 of the conveyor chute 56 is supported by a pair of vertically oriented support rods 62 each of which is secured at the lower end 64 thereof to the rear axle 26 and at the upper end 66 thereof to the upper end portion 60 of the conveyor chute 56. The support rods 62 are suitably cross braced by means of a plate 68 welded, or otherwise suitably secured, to the medial portions of the support rods 62 to provide rigidity. The lower end portion 58 of the conveyor chute 56 is fixedly secured to the front portion 70 of the front axle carrier 30. See FIG. 5.

A scoop 72 is formed on the lower end portion of the conveyor chute 56 and extends downwardly therefrom to a position proximate to the ground surface. It will be readily apparent that by adjusting the four rock shaft mechanisms 48, the scoop 72 can be adjusted vertically to engage the ground surface at various depths or be raised a distance above the ground surface.

A transverse shaft 74 extends horizontally across the lower end portion 58 of the conveyor chute 56 and is journaled therein. A roller 76 is journaled on the shaft 74 and is free to rotate thereon about a horizontal axis. A second transverse shaft 78 extends horizontally across the upper end portion 60 of the conveyor chute 56 and is journaled thereon. A roller 80 is keyed to the transverse shaft 78 and is adapted to rotate therewith about a horizontal axis. A sheave 82 is keyed to one end portion 84 of the shaft 78 and a second sheave 86 is keyed to the opposite end portion 88 of the shaft 78.

An endless conveyor belt 90 extends around the rollers 76 and 80 and is supported thereby within the conveyor chute 56. The conveyor belt 90 frictionally engages the outer periphery of the roller 80 so that rotational movement of the roller 80 is imparted to the conveyor belt 90 in a manner which will be described in greater detail hereinafter. The conveyor belt 90 includes a plurality of buckets or vanes 92 formed on the outer periphery thereof and extending outwardly therefrom. As best shown in FIG. 5, the downwardly extending buckets 92 are positioned adjacent to the floor or base 94 of the conveyor chute 56.

The floor 94 of the conveyor chute 56 comprises a lower portion 96 and an upper portion 98. The lower portion 96 is preferably constructed of 20 guage galvanized sheet steel while the upper portion 98 is preferably constructed of 3/16 inch by 11 guage galvanized wire cloth. The upper portion 98 therefore provides a first screen for purposes which will be described in detail hereinafter.

An accumulator 100 is fixedly secured to the conveyor chute 56 and extends beneath the upper portion 98 thereof. The accumulator 100 comprises an open frame 102 which includes a closed upper end plate 104, and a closed lower end plate 106. A screen 108, having a substantially U-shaped cross-section, is supported by the frame 102 beneath the upper portion 98 of the floor 94 of the conveyor chute 56. The screen 108 is preferably constructed of two plys comprising one ply of ¼ inch galvanized steel hardware cloth which, in turn, supports a second ply of conventional standard screen wire. An aperture 110 is formed in the lower portion of the accumulator 100 adjacent to the closed lower end plate 106. A conduit 112 communicates at its upper end portion 114 with the aperture 110 and extends downwardly therefrom. The conduit 112 is preferably formed from galvanized sheet steel and is preferably rectangular in cross-section although other cross-sectional shapes may be utilized if desired. A second aperture 116 is formed in the lower end portion 118 of the conduit 112 for purposes which will be described in detail hereinafter.

The separator assembly 16 is carried by the frame 12 and comprises a conventional centrifugal blower 120 mounted on the lower end portion 58 of the conveyor chute 56. The blower 120 includes a drive shaft 122 journaled on the conveyor chute 56 and extending horizontally across the lower portion 58 thereof. A suitable air filter 124 is carried by the centrifugal blower 120 in communication with the inlet 126 thereof. The air filter 124 is preferably constructed of galvanized sheet steel and conventional standard screen wire.

A duct 128 communicates at its lower end portion 130 with the air outlet 132 of the blower 120. The duct 128 extends rearwardly and slightly downwardly from the outlet 132 to its lowermost portion 134. The duct 128 extends substantially upwardly and slightly rearwardly from the lowermost portion 134 to its upper end portion 136. The duct 128 is preferably constructed of galvanized sheet steel and is preferably substantially rectangular in cross-section.

A slot 138 is formed in the lowermost portion 134 of the duct 128 and extends transversely across substantially the full width of the duct 128. A venturi assembly 140 comprising a plurality of spaced parallel bars 142 is mounted within the duct 128 between the lowermost portion 134 and the upper end portion 136 thereof. The spaced parallel bars 142 lie in a plane which is substantially normal to the longitudinal axis of the duct 128 at the point of their installation. The venturi assembly 140 provides a substantial reduction in cross-sectional area of the duct 128 along the plane in which the spaced parallel bars 142 lie. The venturi assembly 140 further comprises a pair of plates 144 disposed on opposite sides of the duct 128 through which the opposite ends of each bar 142 respectively extend. The plates 144 thereby retain the spaced parallel bars 142 in the proper spaced parallel relation. A pair of slots 146 are formed in the duct 128 through which the bars 142 of the venturi assembly 140 extend to connect with the plates 144. A pair of threaded bolts 148 extend through the respective outermost parallel bars 142 to rigidly secure the venturi assembly 140 to the duct 128. The aperture 116 of the conduit 112 communicates with a mating aperture 149 formed in the duct 128 at a point just above the venturi assembly 140. See FIG. 9.

The drive assembly 20 is mounted on the conveyor assembly 14 carried by the frame assembly 12. The drive assembly 20 comprises a motor 150, a clutch assembly 152, a pair of first drive V-belts 154, a second drive V-belt 156, a third drive V-belt 158, a drive shaft 160, and a power winch 162.

The motor 150 is fixedly secured to a motor mount 164 which is in turn pivotally secured at its rear margin 166 to the conveyor chute 56 by hinge connection 168. The hinge connection 168 permits the motor mount 164 with the motor 150 attached thereto to swing vertically about a horizontal axis. The forward edge 170 of the motor mount 165 is supported by means of the clutch assembly 152.

The clutch assembly 152 comprises a first clutch link 172 which is pivotally secured at one end thereof to the conveyor chute 56 by means of the hinge connection 174. The opposite end of the first clutch link 172 is pivotally secured to one end of a second clutch link 176 by means of hinge connection 178. The opposite end of the second clutch link 176 is pivotally secured to one end of a threaded rod 180 by means of hinge connection 182. The threaded rod 180 extends upwardly from the hinge connection 182 through a vertically aligned cylindrically shaped aperture 184 formed in a bracket 186 which is fixedly secured to the forward edge 170 of the motor mount 164. The threaded rod 180 is adjustably secured to the bracket 186 by means of a pair of locking nuts 188 which are threadedly secured to the rod 180 respectively above and below the bracket 186. It will be readily apparent that, by adjusting the position of the locking nuts 188 on the rod 180, the distance between the hinge connection 182 and the bracket 186 may be suitably adjusted. A clutch actuating arm 190 is fixedly secured to the medial portion of the second clutch link 176 by suitable means, such as welding, and extends generally forward therefrom in perpendicular alignment with the clutch link 176.

The clutch assembly 152 further includes a clutch and motor mount stop 192 which is fixedly secured to the conveyor chute 56 rearwardly from the hinge connection 174 and in substantial alignment with the clutch links 172 and 176. The stop 192 comprises a forwardly extending clutch linkage stop 194 and an upwardly extending motor mount stop 196. The functions of the stops 194 and 196 will be explained in detail hereinafter.

A pair of V-belt sheaves 198 are keyed to the motor propeller shaft 200. A second pair of V-belt sheaves 202 are keyed to the blower drive shaft 122. The pair of V-belts 154 drivingly interconnect the sheaves 198 and the sheaves 202 whereby rotary motion of the propeller shaft 200 may be imparted to the blower drive shaft 122. A third sheave 204 is also keyed on the blower drive shaft 122. The sheave 82 is keyed on one end portion 84 of the transverse shaft 78 as previously described. The V-belt 156 drivingly interconnects the sheave 204 and the sheave 82 whereby rotary motion of the blower drive shaft 122 is imparted to the transverse shaft 78. It will be readily apparent that the previously described sheaves 198, 202, 204 and 82 and the V-belts 154 and 156, while comprising a preferred construction, may be replaced by other suitable drive means such as sprockets and drive chains.

The drive shaft 160 is journaled at one end 208 in bracket 210 mounted on the conveyor chute 56. The opposite end 202 of the drive shaft 160 is supported by and drivingly connected to the power winch 162 which is mounted on the conveyor chute 56 adjacent the lower end portion 58 thereof. A sheave 214 is keyed to the end portion 208 of the drive shaft 160. The V-belt 158 drivingly interconnects the sheave 86 and the sheave 214 whereby rotary motion of the transverse shaft 78 is imparted to the drive shaft 160.

Figure 2:
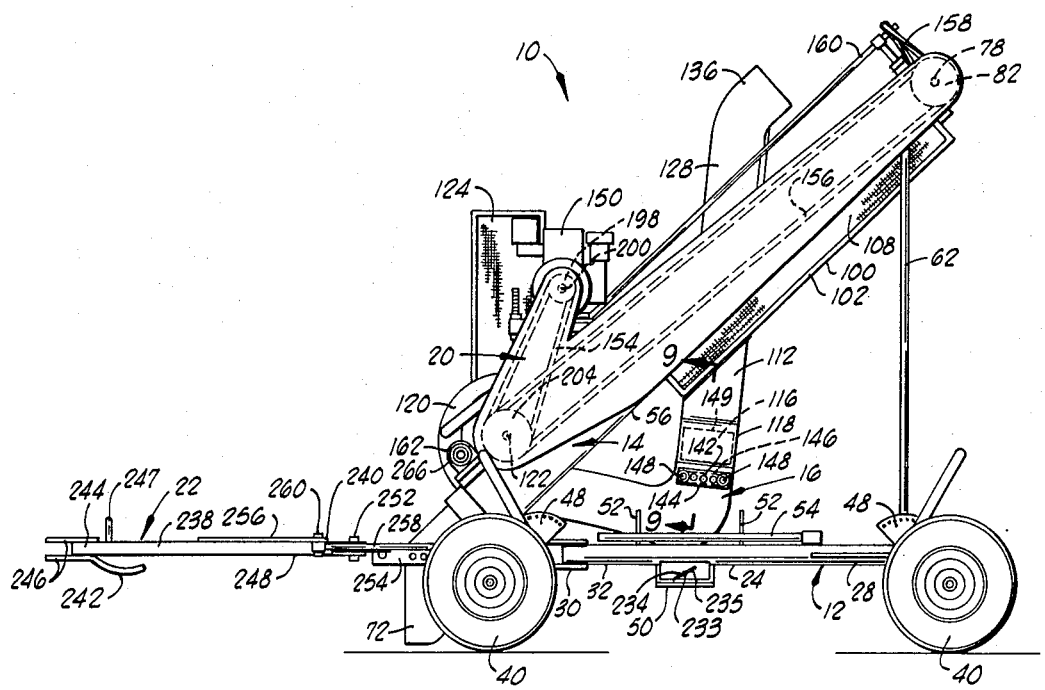
FIG. 2 is a left side elevation view of the present invention.

In operation, the motor 150 rotates the propeller shaft 200 in a counterclockwise direction as viewed in FIG. 2. When the clutch assembly 152 is engaged and the motor 150 is running, counterclockwise rotation is imparted to the blower drive shaft 122 and the transverse shaft 78 by means of the previously described sheaves and V-belts as viewed in FIG. 2. When the clutch assembly 152 is engaged, the elements thereof are in the relative positions shown in FIG. 5. The clutch actuating arm 190 is in its lowermost position and the clutch links 172 and 176 abut the clutch linkage stop 194 at the hinge connection 178. When in this position, the clutch assembly 152 urges the motor mount 164 upwardly about its hinge connection 168 with the conveyor chute 56. This action increases the distance between the centerlines of the motor propeller shaft 200 and the blower drive shaft 122 thereby tensioning and causing the frictional engagement of the V-belts 154 with the respective sheaves 198 and 202 thereby permitting the rotational movement of the propeller shaft 200 to be imparted to the blower drive shaft 122, the transverse shaft 78, and the drive shaft 160.

The clutch assembly 152 is placed in the disengaged position by moving the clutch actuating arm 190 upwardly thereby causing the hinge connection 178 to move forward relative to the apparatus 10. When the hinge connection 178 moves forwardly past an imaginary line extending through the hinge connections 174 and 182, the clutch assembly 152 reaches an overcenter position thereby allowing the motor mount 164 to pivot downwardly about its hinge connection 168 until it rests on the motor mount stop 196. When in this position, the V-belts 154 are no longer urged into frictional engagement with the sheaves 198 and 202 thereby drivingly disengaging the motor 150 from the remainder of the apparatus 10.

The receptacle assembly 18 comprises an elongated hollow container 216 preferably constructed of 14 guage sheet steel. As more clearly shown in FIGS. 6 and 7, the container 216 includes a slot 218 formed in the top side 219 thereof. The slot 218 is substantially equal in size to the slot 138 formed in duct 128. An outward from the hub 284 and a spindle 288 is secured thereto upon which a wheel 40 is journaled. The wheel 40 is retained by a cotter pin 290 extending through the outer end of the spindle 288. A bracket 292 is formed on the hub 284 and an operating handle 294 is pivotally secured to the bracket 292 by a suitable bolt or pin at 296. A plate 298 is fixedly secured to the wheel carrier 36 adjacent to the hub 284 and extends radially outward from the wheel carrier 36. A plurality of apertures 300 are formed in the plate 298 along an arcuate line, the center of each aperture 300 being radially equidistant from the axis of the wheel carrier 36. A stud 302, sized and shaped to slidingly fit within each aperture 300, is formed on the handle 294 adjacent to the plate 298 and extends outwardly from the handle 294 toward the plate 298. The radial distance from the axis of the wheel carrier 36 to the axis of the stud 302 is substantially equal to the radial distance from the axis of the wheel carrier 36 to the arcuate center line through the apertures 300. A compression spring 304 is disposed between the bracket 292 and the handle 294 and continuously urges the stud 302 into engagement with the plate 298. When the stud 302 is in registration with one of the apertures 300 on the spring 304 urges the stud 302 into the aperture 300.

It is readily apparent that by pivoting the handle 294 about its connection 296 against the urging of the spring 304, the stud 302 will be disengaged from the aperture 300 in the plate 298 thereby freeing the hub 284 to be rotated on the wheel carrier 36 to adjust the wheel 40 relative to the frame assembly 12. To facilitate the manual adjustment of the mechanism 48, the extension bar 54 may be slidably connected to the upper end 306 of the handle 294 to provide additional leverage. When not in use, the extension bar 54 is carrier on the center frame member 24 as described above. When the position of the wheel 40 relative to the frame assembly 12 is as desired, the handle is released and the stud 302 engages an aperture 300 thereby locking the mechanism 48.

It will be readily apparent that the mechanism 48 is also mounted on wheel carriers 38 with the arm extending the opposite direction from the hub, however, the construction is substantially identical to that described above and need not be recited again.

OPERATION OF THE PREFERRED EMBODIMENT

To operate the apparatus of the present invention, the wheel carriers 36 and 38 are preferably fully extended thereby providing the widest track on the front and rear axles 34 and 26. The height of the frame assembly 12 is then adjusted so that the scoop 72 will engage the ground slightly below the surface thereof. The ground is preferably comprised of soil which has been loosened by suitable means such as by dragging a harrow thereover.

The clutch assembly 152 is placed in the disengaged position by moving the clutch actuating arm 190 upward thereby allowing the motor mount 164 to rest on the motor mount stop 196. The motor 150 is then started. The motor 150 is preferably a single cylinder gasoline powered engine of suitable horsepower. The cable 266 is unreeled from the winch 162 and drawn forward through the loop 247 on the tongue 238 and secured to a fixed object, such as a tree or stake, some distance in front of the apparatus 10.

The clutch assembly 152 is then engaged by moving the actuating arm 190 downward until the hinge connection 178 bears against the clutch linkage stop 194. The motor 150 then simultaneously drives the centrifugal blower 120, the conveyor belt 90, and the power winch 162. The power winch 162 begins to retrieve the cable 266 and, as a direct result, draws the apparatus across the ground in the direction of the fixed object to which cable 266 is secured. The apparatus 10 is steered in the direction of the fixed object by means of the draft and steering assembly 22 which, in response to the pull of the cable 266 extending through the loop 247, steers the front axle 34. As the apparatus is drawn along the ground, the scoop 72 engages the loose soil and directs portions thereof, upwardly within the scoop 72 toward the buckets or vanes 92 of the conveyor belt 90. The vanes 92 of the moving conveyor belt 90 engage the loose soil and move it upwardly along the floor 94 of the conveyor chute 56. When the soil reaches the upper portion 98 of the floor 94 a first screening operation is thereby performed on the soil and the smaller particles of the soil and the lead shot contained therein are allowed to pass downwardly through the wire mesh of the upper portion 98 and drop downwardly into the accumulator 100. The larger pieces of soil which fail to pass downwardly through the screen in the upper portion 98 are conveyed upwardly within the conveyor chute 56 by the conveyor 90 and passed out the upper end portion 60 thereof and drop downwardly to the ground.

The dust particles or, other extremely fine particles of the soil which drop into the accumulator 100 pass outwardly through the screen 108 thus leaving only the larger particles of soil and the lead shot mixed therein. The larger particles of soil and the lead shot slide downwardly along the screen 108 to the aperture 110 formed in the accumulator 100 where they drop downwardly into the conduit 112. The soil and lead shot continue down through the conduit 112 and pass through the aperture 116 formed therein and the aperture 149 formed in the duct 128. At this point, the soil and the lead shot are within the duct 128 immediately above the venturi assembly 140.

A stream of air flows through the duct 128 from the blower 120 and passes upwardly through the venturi assembly 140. As the stream of air passes through the venturi assembly 140, the air velocity and turbulence at that point is substantially increased due to the reduction in cross-sectional area within the duct 128 at the venturi assembly 140. This increase in air velocity is sufficient to arrest the downward motion of the soil particles and to force the particles of soil upward through the duct 128 to exit from the upper end portion 136 thereof. However, the air velocity at the venturi assembly 140 is not sufficient to force the lead shot upwardly through the duct 128 because the lead shot has a much higher specific gravity than the accompanying soil. The lead shot therefore falls downwardly through the venturi assembly 140 to the lowermost portion 134 of the duct 128 where the lead shot then falls through the slot 138 formed therein.

When the lead shot falls through the slot 138 it also falls through the slot 218 communicating therewith which is formed in the container 216 of the receptacle assembly 18. The lead shot is retained in the container 216 of the receptacle assembly 18 until it is desired to empty the container 216.

opening 220 is formed in the inner end 221 of the container 216. A cover 222 is slidably disposed on the top side 219 of the container 216 and is adapted to slide longitudinally over the slot 218 to alternately fully close and fully open the slot 218. The cover 222 has an upwardly extending tab 224 formed on one end thereof which engages the outer surface of the duct 128 when the receptacle assembly 18 is mounted on the receptacle support 50.

When installed on apparatus 10, the receptacle assembly 18 is placed on the receptacle support 50 and is slid inwardly thereon toward the center frame member 24 until fully seated on the receptacle support 50. As the receptacle assembly 18 is moved toward the center frame member 24 the upwardly extending tab 224 of the cover 222 engages the outer surface of the duct 128 thereby sliding the cover 222 to open the slot 218. When the receptacle assembly 18 is fully seated on the receptacle support 50 the slot 218 is completely open and communicates with the slot 138 formed in the duct 128. A substantially air tight seal is provided between the slot 218 and the slot 138 by means of a pair of sponge rubber strips 226 respectively secured to the duct 128 on each side of the slot 138. The opening 220 in the container 216 is closed by means of an L-shaped closure member 228 which is vertically slidably mounted on the inner end 221 of the container 216 adjacent to the center frame member 24. A Z-shaped clip 229 bridges between the upper end of the L-shaped closure member 228 and the top side 219 of the container 216. A threaded stud 230 is suitably secured, as by welding, to the top side 219 of the container 216 and extends upwardly through an aperture 231 formed in the clip 229. A wing-nut 232 is threaded onto the stud 230 to retain the clip 229 in a proper position engaging and retaining the closure member 228 in proper position to close the opening 220 in the container 216. By turning the wing-nut 232 so as to thread it downwardly on the stud 230, the Z-shaped clip 229 and the L-shaped closure member 228 are forced downwardly relative to the container 216. A threaded stud 233 is suitably secured, as by welding, to the closure member 228 and extends outwardly therefrom. When the receptacle assembly 18 is fully seated in the receptacle support 50 the stud 233 extends through aligned apertures 234 formed in the support 50. A wing-nut 235 is threaded on the stud 233 thereby retaining the container 216 in the receptacle support 50 with the slots 218 and 138 in communication.

A hand pull 236 is secured to the outer end of the container 216 to facilitate the removal of the receptacle assembly 18 from the receptacle support 50. A carrying handle or bail 237 is pivotally secured to the container 216 to provide convenient means for carrying the receptacle assembly 18 when removed from the receptacle support 50.

The draft and steering assembly 22 comprises a tongue 238 and a steering linkage 240. A skid 242 is fixedly secured to one end portion 244 of the tongue 238 and extends downwardly therefrom. A clevis 246 is also fixedly secured to the end portion 244 to provide connecting means to a draft vehicle. A loop or eye, 247 is formed on the end portion 244 of the tongue 238 and extends upwardly therefrom. The opposite end portion 248 of the tongue 238 is pivotally secured to a draft bracket 250 by means of hinge connection 252. The draft bracket 250 is pivotally secured to a pair of brackets 254 which are fixedly secured to the scoop 72. It is readily apparent that the draft bracket 250 is adapted to pivot vertically about its pivotal connection with the brackets 254. A tongue arm 256 is fixedly secured at one end thereof to the medial portion of the tongue 238 and is pivotally secured at the opposite end thereof to one end of a link 258 by means of hinge connection 260. The opposite end of the link 258 is pivotally secured to one end of a front axle arm 262 by means of hinge connection 264. The opposite end of the front axle arm 262 is fixedly secured to the front axle 34.

It will be readily apparent in viewing FIG. 4 that lateral swinging movement of the tongue 238 about the hinge connection 252 will cause a corresponding turning movement of the front axle 34 about its pivotal connection with the front axle carrier 30 in response thereto through the medium of the arms 256 and 262 and the link 258. The skid 242 is shaped such that when the tongue 238 is otherwise unsupported, the skid 242 will engage the ground to support the tongue 238 and to support the clevis 246 above the surface of the ground to prevent the clevis 246 from digging into the ground.

The power winch 162 carries a steel cable 266 wound thereon. The power winch 162 is driven by the drive shaft 160 as described above. The power winch 162 provides the means for propelling the apparatus 10 over the ground when in operation as will be described hereinafter.

As shown in FIG. 8 a door 268 is vertically slidably secured to the upper end portion 136 of the duct 128. An elongated slot 270 is formed in the door 268. A threaded stud 272 is suitably secured, as by welding, to the upper end portion 136 of the duct 128 and extends through the slot 270. A wing-nut 274 is threaded on the stud 272 to adjustably secure the door 269 to the duct 128. The door 268 may be manually adjusted up or down, as shown by the arrows, to vary the effective cross-sectional area of the upper end portion 136 of the duct 128 as may be desired. When the proper cross-sectional area is achieved, the wing-nut 274 may be tightened on the stud 272 thereby securing the door 268 to the duct 128.

As shown in FIG. 9, a door 276 is vertically slidably secured to the duct 128 adjacent to the aperture 148 formed therein. A threaded stud 278 is suitably secured, as by welding, to the duct 128 and extends therefrom through an elongated slot 280 formed in the door 276. A wing-nut 282 is threaded on the stud 278. The door 276 may be manually adjusted up or down, as shown by the arrows, to vary the effective cross-sectional area of the aperture 149 of the duct 128 as may be desired. When the proper cross-sectional area is achieved, the wing-nut 282 may be tightened on stud 278 thereby securing the door 276 to the duct 128.

FIG. 10 illustrates in detail a typical rock shaft mechanism 48 for providing height adjustment of the frame assembly 12 relative to the ground at each wheel 40. The mechanism 48 includes a hub 284 journaled on the outer end of a wheel carrier. The apparatus illustrated in FIG. 10 shows installation of the mechanism 48 on a wheel carrier 36. An arm 286 extends radially To empty the container 216, the clutch assembly 152 is disengaged as previously described and the thumb screw 235 is removed from the stud 233 of the receptacle assembly 218. The receptacle assembly 18 is removed from the receptacle support 50 by grasping the handle 236 and withdrawing the receptacle assembly 18 therefrom. The cover 222 should be slid over the slot 218 formed in the container 216 to prevent accidental spillage of the shot through the slot 218.

To remove the shot from the container 216, the wing nut 232 is loosened a predetermined amount on the stud 230 thereby allowing the L-shaped closure member 238 to be lifted slightly thus permitting the shot to exit through the opening 220 formed in the container 216. When the shot is removed, the wing nut 232 is again tightened on the stud 230 to retain the closure member 228 securely in the container 216. The receptacle assembly 18 is then replaced in the receptacle support 50 and the wing nut 235 is replaced on the stud 233 to secure the receptacle assembly 18 in the receptacle support 50. It will be readily apparent from an inspection of FIG. 7 that, when the receptacle assembly 18 is replaced in the receptacle support 50, the cover 222 is automatically placed in an open position by means of the engagement of the tab 224 thereof with the outer surface of duct 128. This feature prevents the inadvertant operation of the apparatus 10 with the cover 222 of the receptacle assembly 18 in a closed position. The apparatus 10 is now again in condition to continue separating lead shot from soil upon the engagement of the clutch assembly 152 as described above.

When it is desired to discontinue operation of the apparatus 10 and to remove it to a suitable storage site, the clutch assembly 152 is disengaged and the cable 266 is disconnected from the fixed object to which it was previously attached. The clutch assembly 152 may then be engaged to cause the power winch 162 to rewind the cable 266 thereon. The clutch assembly 152 should then be disengaged and the motor 150 shot off. The rock shaft mechanism 48 on each end of the axles 26 and 34 should be adjusted to raise the frame assembly 12 upward relative to the ground to a point whereby scoop 72 clears the surface of the ground by a sufficient amount to permit free travel of the apparatus 10 thereover. The tongue 238 may then be secured to a suitable draft vehicle by means of the clevis 246 and the apparatus 10 may be drawn thereby to a suitable storage site.

Changes may be made in the construction and arrangement of parts or elements of the embodiment described herein without departing from the spirit and scope of the invention as defined herein.

What is claimed is:

1. An apparatus for separating pelletized material of relatively high specific gravity from a heterogeneous granular material of relatively low specific gravity comprising:
   a blower having an inlet portion and an outlet portion;
   a duct communicating at one end thereof with the outlet portion of said blower and having the opposite end thereof extending upwardly from said blower;
   a plurality of spaced parallel bars extending transversely across said duct and secured thereto;
   conduit means communicating with said duct at a point above said bars for conveying a mixture of said pelletized material and said heterogeneous granular material into said duct;
   receptacle means communicating with said duct at a point below said bars for receiving and holding said pelletized material which has been separated from said granular material; and
   drive means connected to said blower for driving said blower and causing air to be blown thereby from the outlet portion thereof through said duct and over said bars.

2. An apparatus as defined in claim 1 characterized further to include:
   a frame upon which said blower, said duct, said bars, said conduit means, said receptacle means, and said drive means are carried, said frame having a front portion and a rear portion;
   material receiving means secured to the front portion of said frame for receiving said granular material and said pelletized material;
   conveyor means carried by said frame and communicating with said material receiving means for conveying the mixture of said granular material and said pelletized material from said material receiving means; and
   sifting means communicating between said conveyor means and said conduit means for separating excessively large and excessively small pieces and particles of said granular material from the mixture of said granular material and said pelletized material as the mixture passes therethrough from said conveyor means to said conduit means.

3. The apparatus as defined in claim 2 wherein said sifting means is characterized further to include:
   first screen means communicating with said conveyor means for separating excessively large pieces of said granular material from the mixture of said granular material and said pelletized material; and
   second screen means communicating with said conduit means for receiving the mixture of said granular material and said pelletized material and separating the excessively small particles of said granular material from the mixture of said granular material and said pelletized material as the mixture passes therethrough to said conduit means.

4. The apparatus as defined in claim 2 characterized further to include:
   support means secured to said frame for supporting said apparatus on the ground in a manner providing free movement of said apparatus over the ground.

5. The apparatus as defined in claim 4 characterized further to include:
   propulsion means carried by the frame for propelling said apparatus over the ground.

6. The apparatus as defined in claim 5 characterized further to include:
   steering means carried by the frame, operatively connected to said support means, and responsive to said propulsion means, for steering said apparatus along a desired path as said apparatus is propelled over the ground.

7. The apparatus as defined in claim 5 wherein said propulsion means comprises:
   a winch carried by the frame;

a cable having a first end and a second end, said cable being secured at the first end thereof to said winch;

means operatively interconnecting said winch and said drive means for transmitting power from said drive means to said winch to wind said cable thereon; and means connected to the second end of said cable for securing said cable to a fixed object whereby the winding of said cable on said winch propels said apparatus toward the fixed object.

8. An apparatus for separating pelletized material of relatively high specific gravity from a heterogeneous granular material of relatively low specific gravity comprising:

a blower having an inlet portion and an outlet portion;

duct means communicating at one end thereof with the outlet portion of said blower and having the opposite end thereof extending upwardly from said blower for conveying air from the outlet portion of said blower;

a plurality of spaced, parallel bars extending transversely across said duct means and secured thereto;

means for feeding a mixture of said pelletized material and said heterogeneous granular material into said duct means above said bars;

receptacle means communicating with said duct means at a point below said bars for receiving and holding said pelletized material which has been separated from said granular material; and drive means connected to said blower for driving said blower and causing air to be blown thereby from the outlet portion thereof through said duct means and over said bars.

* * * * *

PO-1050
(5/69)

UNITED STATES PATENT OFFICE
CERTIFICATE OF CORRECTION

Patent No. 3,696,870      Dated October 10, 1972

Inventor(s) James L. Hinson

It is certified that error appears in the above-identified patent and that said Letters Patent are hereby corrected as shown below:

In the abstract, line 1, after "material" the word "or" should read --of--.

In the printed specification, column "7" should be column --9--. Column "8" should be column --10--. Column "9" should be column --7--. Column "10" should be column --8--.

Signed and sealed this 6th day of February 1973.

(SEAL)
Attest:

EDWARD M. FLETCHER, JR.
Attesting Officer

ROBERT GOTTSCHALK
Commissioner of Patents